United States Patent [19]

Kim

[11] Patent Number: 5,274,764
[45] Date of Patent: Dec. 28, 1993

[54] SYSTEM FOR CONTROLLING CONTINUOUS DATA INPUT OF AN OPTICAL DISK

[75] Inventor: Dae Y. Kim, Seoul, Rep. of Korea

[73] Assignee: Goldstar Co., Ltd., Rep. of Korea

[21] Appl. No.: 668,860

[22] Filed: Mar. 13, 1991

[30] Foreign Application Priority Data

Mar. 15, 1990 [KR] Rep. of Korea .............. 3500/1990

[51] Int. Cl.$^5$ ............................................. G06F 5/06
[52] U.S. Cl. ..................... 395/250; 364/DIG. 1;
364/236.2; 364/238.3; 364/239.1; 364/249.4;
364/239.7; 364/271.9
[58] Field of Search .............. 395/250, 275, 425, 550

[56] References Cited

U.S. PATENT DOCUMENTS

| | | | |
|---|---|---|---|
| 4,835,757 | 5/1989 | Abiko | 360/53 |
| 4,841,513 | 6/1989 | Hassan et al. | 395/250 |
| 4,956,808 | 9/1990 | Aakre et al. | 395/250 |
| 4,974,197 | 11/1990 | Blount et al. | 395/250 |
| 5,034,914 | 7/1991 | Osterlund | 395/425 |

FOREIGN PATENT DOCUMENTS 0248478 9/1987 European Pat. Off. .

OTHER PUBLICATIONS

IBM Technical Disclosure Bulletin; vol. 22, No. 1, Jun. 1979, New York, J. Pertzborn: "Buffer Overrun Detection" pp. 299-301.

*Primary Examiner*—Debra A. Chun
*Attorney, Agent, or Firm*—Ostrolenk, Faber, Gerb & Soffen

[57] ABSTRACT

A continuous data input control system for an optical disk comprising an optical disk digital signal processor for outputting serial data, beat clock signal and left-/right clock signal, an optical disk ROM decoder for decoding and transmitting the data from the processor, a microprocessor for controlling the whole system, and a data input controller for controlling the output of the digital signal processor. The data input controller includes a clock generator, a counter, a first control signal generator, an AND gate, a stop point detector for shifting the serial data of the digital signal processing unit by synchronization with the clock pulse signal of an AND gate, for latching the data when the buffer RAM is in the overflow state in response to the output level of the control signal generating unit, and for detecting the data of the stop point by comparing the latched data with the data being presently inputted, when the overflow of the buffer RAM is released. It also includes a second control signal generator, and a switching unit.

By these arrangements, digital audio data on the optical disk can be reinputted from the data input stop point after the data input operation is stopped due to a buffer overflow.

8 Claims, 2 Drawing Sheets

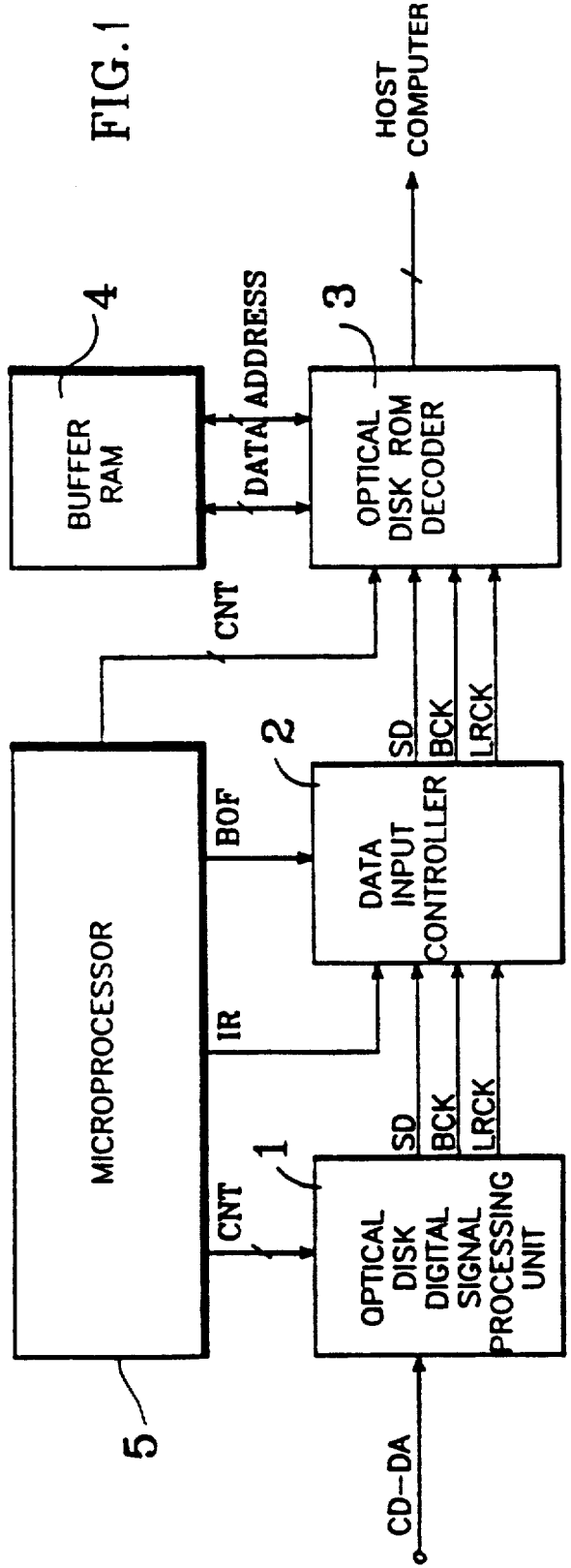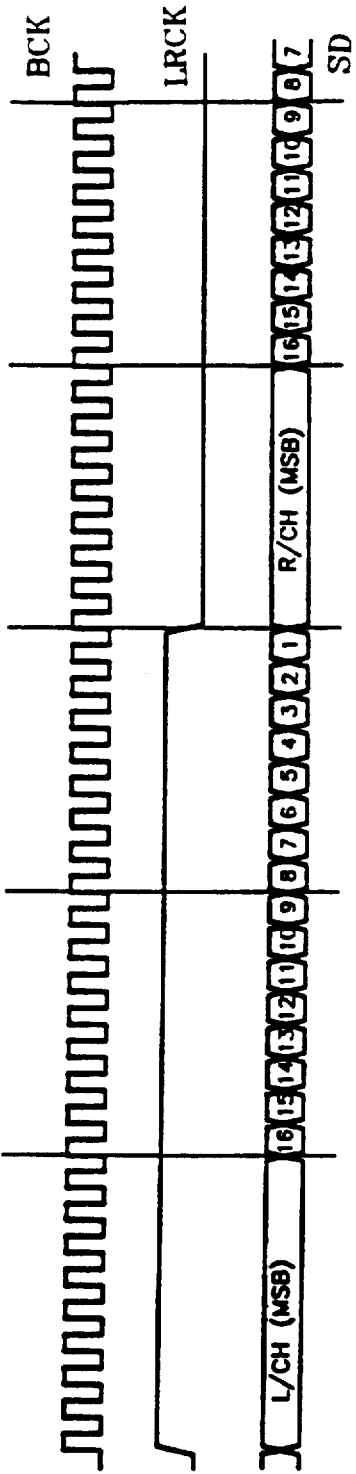

SYSTEM FOR CONTROLLING CONTINUOUS DATA INPUT OF AN OPTICAL DISK

BACKGROUND OF THE INVENTION

The present invention relates to a digital audio data input system for an optical disk reproducing apparatus, more particularly, to a system for controlling continuous data input for an optical disk in which a data input controller is provided to input continuously, when the speed of transmission to a host computer returns to a normal state after an input operation of digital audio data is interrupted on account of an overflow in a buffer ROM, the data from the data input stop point.

In conventional optical disk reproducing system, when a digital audio data on an optical disk read by a disk pickup is transmitted to a host computer through an optical disk digital signal processing unit and an optical disk ROM decoding unit, the optical disk ROM decoding unit stores a serial data stream inputted from the optical disk digital signal processing unit to a buffer RAM, for decoding the data and transmitting the data to the host computer, and then once a predetermined amount of data is stored in the buffer RAM, it begins to transmit the data to the host computer. At this time, in case that the speed of transmission of data to the host computer is same as or faster than the speed that the optical disk digital signal processing unit reads the data, there arises no problem. But, in case that the transmission speed is slower (this phenomenon in due to the processing speed of the host computer and takes place in case that the host computer attends to tasks other than the data reception.), the data not transmitted to the buffer RAM is piled up, resulting in an overflow phenomenon. At this moment, the optical disk ROM decoder stops the data input operation from the optical disk digital signal processing unit and has to notice this point so that when the buffer RAM is available, the data from the interruption point can be inputted from the optical disk digital signal processing unit.

In such a conventional optical disk reproducing system, the data read out of the disk is processed at the optical disk digital signal processing unit into a desired data and outputted to the optical disk ROM decoding unit in the serial format. At this time, the optical disk ROM decoding unit detects 12 bytes of synchronizing pattern FF, OO, FF, FF, FF, FF, FF, FF, FF, FF, OO, FF out of serial data and then starts to receive the serial data. The data format recorded in the ROM disk of the optical disk player has 12 bytes of synchronizing pattern so that the optical disk ROM decoding unit can receive the data. However, because there are no such 12 bytes synchronizing pattern in the digital signal data format recorded in the disk of the optical disk player, the data can not be inputted to the optical disk ROM decoding unit in an appropriate timing. Also, when the input operation is interrupted by an overflow of buffer, it is not possible to meet the input retry timing precisely.

SUMMARY OF THE INVENTION

Therefore, it is an object of the present invention to provide a continuous data input control system which eliminates the above problems encountered in the prior art system.

Another object of the present invention is to provide a continuous data input control system in which 4-byte data that before the data input operation to an optical disk ROM decoding unit is interrupted by an overflow of buffer, is stored in latches of a data input control unit and then a serial data stream outputted to an optical disk digital signal processing unit is connected to the optical disk ROM decoding unit when the data stored in the latches are identical to the data being inputted to the data input control unit at the time of data input retrying, so that the data after the input interruption point can be inputted.

In accordance with the present invention, the above objects can be accomplished by providing a continuous data input control system for an optical disk comprising an optical disk digital signal processor, an optical disk ROM decoder, a microprocessor, and a data input control unit for controlling the output of the serial data, beat clock signal and left/right clock signal in response to the data transmission to a host computer upon receiving the output signal of the optical disk digital signal processor.

BRIEF DESCRIPTION OF THE DRAWINGS

The above and other objects, features and advantages of the present invention will be more clearly understood from the following detailed description taken in conjunction with the accompanying drawings, in which:

FIG. 1 is a view showing an arrangement of a continuous data input control system for an optical disk in accordance with the present invention;

FIGS. 3A to 3C are views showing waveforms of digital audio data outputted from an optical disk digital signal processing unit shown in FIG. 1.

DETAILED DESCRIPTION OF THE INVENTION

Figure 2:
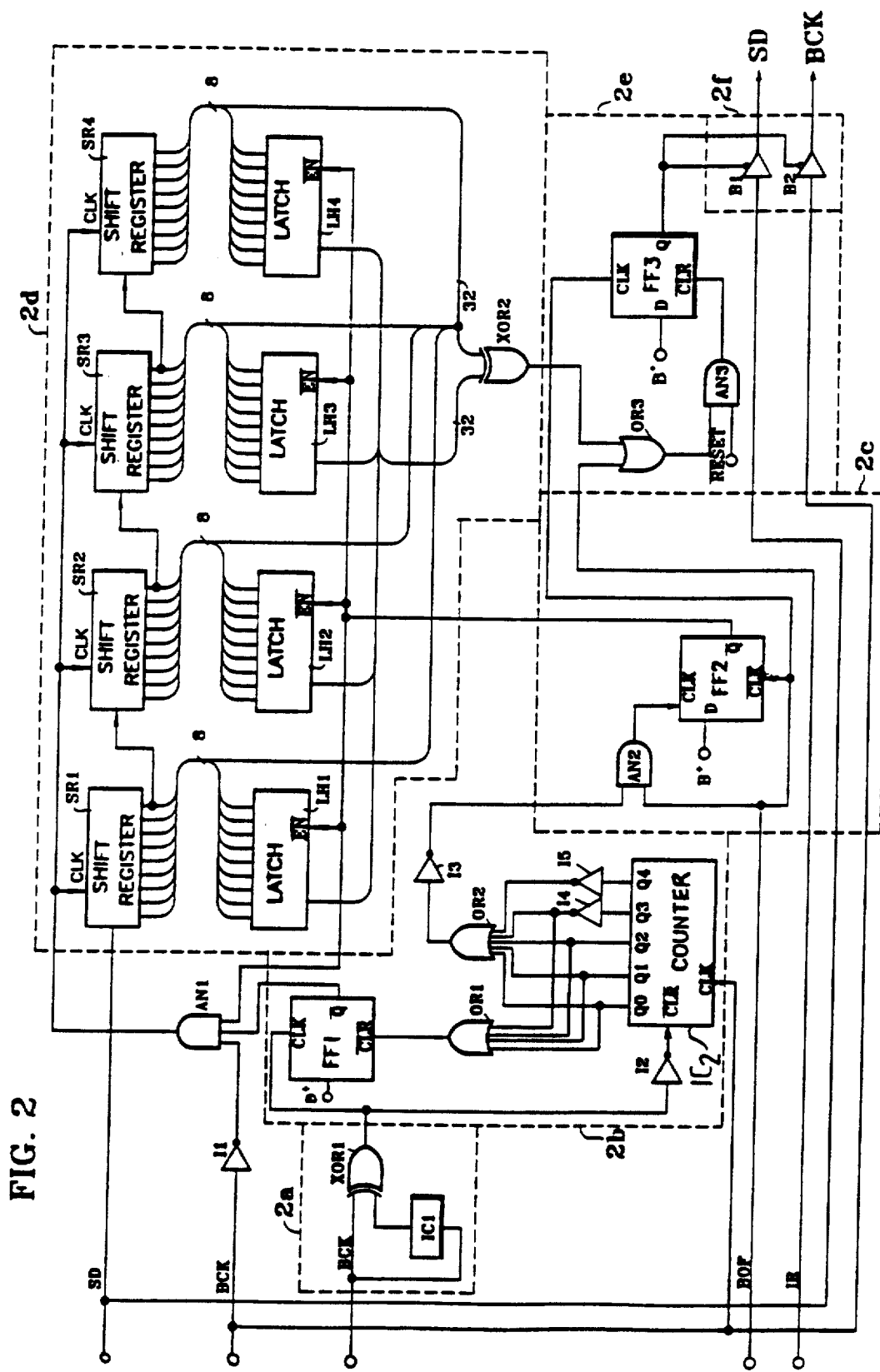
FIG. 2 is a schematic circuit diagram of a data input control unit shown in FIG. 1.

Referring to FIG. 1, the system of the present invention comprises an optical disk digital signal processing unit, which receives digital audio data CD-DA on an optical disk as an input to process and outputs a serial data SD, a beat clock signal BCK, and a left/right clock signal LRCK; a data input control unit 2 which receives as an input the serial data SD, beat clock signal BCK and left/right clock signal LRCK outputted from the optical disk digital signal processing unit 1 and controls the output of the serial data SD, beat clock signal BCK and left/right clock signal LRCK in response to the data transmission state to a host computer; an optical disk ROM decoding unit 3 which receives as an input the serial data SD, beat clock signal BCK and left/right clock signal LRCK outputted from the data input control unit 2 to decode and supplies the serial data SD in turn storage in a buffer RAM 4 and transmits the stored data to the host computer; and a microprocessor 5 which controls the whole system by outputting an input retry signal IR, a buffer overflow signal BOF and a control signal CNT in response to the data-storage state of the buffer RAM 4.

Referring to FIG. 2, the data input control unit 2 comprises a clock generator 2a including an integrator IC1 and an exclusive OR gate XOR1, for receiving as an input the left/right clock signal LRCK outputted from the optical disk digital signal processing unit to produce a clock signal and a clear signal in line with a predetermined timing; a counting unit 2b including a counter IC2, inverter gates I2-I5, OR gates OR1-OR2, and a flip-flop FF1, for counting the predetermined value of the beat clock signal BCK of the optical disk digital signal processing unit 1 by means of the clock signal and clear signal of the clock generator 2a to output a control signal; a control signal generator 2c including an AND gate AN2 and a flip-flop FF2, for receiving as an input the clock signal of the counting unit 2b and the buffer overflow signal BOF of the microprocessor 5 to produce a control signal; and AND gate AN1 for ANDing the output of the control signal generator 2c, the beat clock signal BCK through an inverter gate I1 and the output signal of the counting unit 2b; a stop point detecting unit 2d including shift registers SR1-SR4, latches LH1-LH4 and an exclusive OR gate XOR2, for receiving the serial data SD of the optical disk digital signal processing unit 1 in response to the clock signal of the AND gate AN1 to shift, latching 4-byte data when the buffer RAM 4 is overflowed by being enabled by the clock signal of the control signal generator 2c, and detecting the data of the input stop point by comparing the latched 4-byte data and the serial data SD being inputted at present when the overflow is released; a control signal generator 2d including an OR gate OR3, an AND gate AN3 and a flip-flop FF3, for receiving as an input the output signal of the stop point detecting unit 2d, the buffer overflow signal BOF, the retry signal IR and the reset signal RESET to produce a control signal; and a switching unit 2f including buffers B1 and B2, for outputting the serial data SD and beat clock signal BCK to the optical disk ROM decoding unit 3 by being turned on/off in response to the output of the control signal generator 2e.

Now, the operation of the system of the present invention configured as above will be described in detail with reference to FIG. 3.

In a normal state, that is, when the buffer RAM 4 is not overflowed, the optical disk digital signal processing unit 1 reads digital audio data CD-DA of an optical disk outputted from a disk pickup by the control signal CNT of the microprocessor 5 and processes the data into a data required to the transmission, and then applies the beat clock signal BCK, left/right clock signal LRCK and serial data SD as shown in FIGS. 3A to 3C to the input of stop point detecting unit 2d, the input of switching unit 2f, and the input of clock generator 2a in the data input control unit 2. The left/right clock signal LRCK inputted to the clock generator 2a is applied to one input of the exclusive OR gate XOR1 as a high pulse, as shown in FIG. 3B and applied to another input of the exclusive OR gate XOR1 through the integrator IC1 as a low pulse, so that at the output of the exclusive OR gate XOR1 a momentary high pulse H is outputted (That is, for a predetermined period of time so that a capacitor of the integrator IC1 is charged with a current corresponding to the left/right clock LRCK.), thereafter a low pulse L is continuously outputted.

The high pulse H outputted from the exclusive OR gate XOR1 is applied to the clock terminal CLK of the flip-flop FF1 in the counting unit 2b and inverted into a low pulse L through the inverter gate I2 and then applied to the clear terminal $\overline{CLR}$ of the counter IC2. Accordingly, the counter IC2 is cleared at the edge of the left/right clock signal LRCK and counts the beat clock signal BCK. At this moment, because a low pulse L is outputted from the output terminal Q3 of the counter IC2 during 8 periods and inverted into a high pulse H through the inverter I4 and ORed by the OR gate OR1 to be applied to the clear terminal $\overline{CLR}$ of the flip-flop FF1, a low pulse L is outputted from the output terminal Q of the flip-flop FF1 and then applied to the input of the AND gate AN1. On the other hand, since an overflow does not occur at the buffer RAM 4, the buffer overflow signal BOF is outputted from the microprocessor 5 as a low signal L and applied to one input terminal of the AND gate AN2 in the control signal generating unit 2c as well as to the clear terminal CLR of the flip-flop FF2. And, the low pulse signal L outputted from the output terminals Q3 and Q4 of the counter IC2 is inverted into a low pulse L through the inverter gates I4 and I5, OR gate OR2 and inverter gate I3 and then applied to the other input of the AND gate AN2, so that a low pulse L is outputted from the output thereof and applied to the clock terminal CLK of the flip-flop FF2. Accordingly, from the output terminal Q of the flip-flop FF2, a high pulse H is outputted and applied to the other input of the AND gate AN1 which receives the beat clock signal BCK as an input. And since a low pulse L is outputted from the output of the AND gate AN1 and applied to the clock terminal CLK of the shift registers SR1-SR4 in the stop point detecting unit 2d, the shift registers SR1-SR4 can not shift the highest beat of left channel MSB of the serial data SD, which is outputted from the optical disk digital signal processing unit 1 for 8 periods of the beat clock signal BCK after the edge of the left/right clock signal LRCK.

Thereafter, when the capacitor of the integrator IC1 in the clock generator 2a is completely charged with the left/right clock signal LRCK, a low pulse L is outputted from the output of the exclusive OR gate XOR1 and applied to the clock terminal CLK of the flip-flop FF1 in the counting unit 2b, and then applied to the clear terminal $\overline{CLR}$ of the counter IC2 after being inverted into a high pulse at the inverter gate I2. As a result, the counter IC2 counts from the ninth rising edge of the beat clock signal BCK, after the edge of the left/right clock signal LRCK, to the 24th rising edge that the left/right clock signal LRCK is inverted into a low pulse L.

Accordingly, at the output terminal Q of the flip-flop FF1 which receives the low pulse L as a clear input, a high pulse H is outputted to one input of the AND gate AN1. And, since the buffer overflow signal BOF is maintained as a low pulse L, a high pulse H is outputted from the output terminal Q of the flip-flop FF2 in accordance with the clear-state to the other input of the AND gate AN1 which receives the beat clock signal BCK as an input, to ANDed therein and then applied to the clock terminals CLK of the shift registers SR1-SR4 in the stop point detecting unit 2d. Thus, the serial data SD outputted from the optical disk digital signal processing unit 1 is shifted in turn at the shift registers SR1-SR4 in line with the timing of the beat clock signal BCK outputted from the AND gate AN1.

On the order hand, the buffer overflow signal BOF is applied in a low pulse state to the clear terminal CLR and clock terminal CLK of the flip-flop FF2 in the control signal generating units 2c and 2e, and a low pulse signal L is outputted from the outputs of the latches LH1-LH2 as no serial data SD is connected thereto, to one input of the exclusive OR gate XOR2, and since the serial data SD shifted at the shift registers SR1-SR4 is applied to the other input of the exclusive OR gate XOR2, a high pulse signal H is outputted from the output thereof, so that the clear terminal $\overline{CLR}$ of the flip-flop FF3 in the control signal generating unit 2e is released by the OR gate OR3 and the high reset pulse signal $\overline{RESET}$. As a result, a low pulse signal L is outputted from the output terminal Q of the flip-flop FF3 to enable the buffers B1 and B2 of the switching unit 2f, so that the serial data SD and the beat clock signal BCK outputted from the optical disk digital signal processing unit 1 is inputted to the optical disk ROM decoding unit 3 through the switching unit 2f. And, the optical disk ROM decoding unit 3 designates addresses of the buffer RAM 4 to store the serial data SD therein via data bus and decodes the stored serial data SD to transmit to the host computer.

At this moment, the case that an overflow has occurred at the buffer RAM 4 as the data transmission speed to the host computer is slower than the speed for reading data at the optical disk digital signal processing unit 1, the microprocessor 5 senses the overflow and outputs the buffer overflow signal BOF in a high pulse H to one input of the AND gate AN2 in the control signal generating unit 2c, to the clear terminal $\overline{CLR}$ of the flip-flop FF2 and to the clock terminal CLK of the flip-flop FF3. And, since the high pulse H outputted from the counting unit 2b is applied to the other input of the AND gate AN2, a high pulse H is outputted from the output thereof and applied to the clock terminal CLK of the flip-flop FF2. Accordingly, a low pulse L is outputted from the output terminal Q of the flip-flop FF2 and applied to the AND gate AN1, thereby preventing the serial data SD from inputting to the shift registers SR1-SR4 and enabling the latches LH1-LH4 so that the four bytes of the serial data SD being shifted at the shift registers SR1-SR4 are stored in the latches LH1-LH4.

At this moment, a retry signal IR is outputted from the microprocessor 5 in a high pulse signal H and applied to one input of the OR gate OR3 of the control signal generating unit 2e, and the 4-byte serial data SD shifted at the shift registers SR1-SR4 are identical to the 4-byte serial data SD latched at the latches LH1-LH4, so that a low pulse L is outputted from the exclusive OR gate XOR2. As a result, a high pulse H is outputted from the OR gate OR3 which receives the retry signal as an input and a high pulse from the reset terminal $\overline{RESET}$ is ANDed at the AND gate AN3 to release the clear terminal $\overline{CLR}$ of the flip-flop FF3, so that a high pulse is outputted from the output terminal Q of the flip-flop FF3 to disable the buffers B1 and B2 of the switching unit 2f. Accordingly, the input operation of the serial data SD and the beat clock signal BCK to the optical disk ROM decoding unit 3 is stopped.

Thereafter, the data within the buffer RAM 4 is transmitted to the host computer, the disk pickup moves to the original position, and the retry signal IR from the microprocessor 5 is applied to one input of the OR gate OR3 of the control signal generating unit 2e in a low pulse signal. At this time, since the buffer overflow signal BOF is in an inactive state L, the serial data SD is applied to the shift registers SR1-SR4 by being synchronized with the clock pulse of the AND gate AN1, thereby the 4-byte serial data SD latched at the latches LH1-LH4 by the exclusive OR gate XOR2 when the buffer is overflowed and the present 4-byte serial data SD being inputted to the 8-bit shift registers SR1-SR4 are compared with one another. At this moment, is case that data, which is identical to the serial data SD latched at the latches LH1-LH4, is inputted to the 8-bit shift registers SR1-SR4, the output of the exclusive OR gate XOR2 along with the retry signal IR is applied to the clear terminal CLR of the flip-flop FF3 in a low pulse L through the OR gate OR3 and the AND gate AN3 which receives the reset signal RESET of high pulse as an input, so that a low pulse L is outputted from the output terminal Q of the flip-flop FF3 to enable the buffers B1 and B2 of the switching unit 2f which have been disabled, and to apply the serial data SD and the beat clock signal BCK to the optical disk ROM decoding unit 3, thereby enabling the data transmission to the host computer in normal from the data transmission stop point.

As apparent from the above description, in accordance with the system of the present invention, it is possible to reinput the data of the data transmission stop point once the data input operation is stopped on account of a buffer overflow.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A continuous data inputting control system for an optical disk, comprising:
   an optical disk digital signal processing unit for processing digital audio data being inputted through a disk pick-up and for outputting a serial data, a beat clock signal and a left/right clock signal;
   a data input control unit coupled to the optical disk digital signal processing unit for receiving and for controlling the outputting of the serial data, the beat clock signal and the left/right clock signal to a host computer;
   an optical disk-ROM (read only memory) decoding unit coupled to the data input control unit for receiving and decoding the serial data, the beat clock signal and the left/right clock signal being outputted from the data input control unit for storing the received serial data in a buffer RAM (random access memory) and for transmitting the stored serial data to the host computer; and
   a microprocessor for supplying to the data input control unit an input retry signal, a buffer overflow signal and a first control signal in response to a predetermined storing condition of the buffer RAM to thereby control the continuous data inputting control system.

2. The system as claimed in claim 1, wherein the data input control unit comprises:
   a clock generating unit for producing a clock signal by detecting a change point of a left track which is inputted from the optical disk digital signal processing unit;
   a counting unit for producing a second control signal for controlling the serial data by counting values of the beat clock signal in response to the clock signal of the clock generator and for producing a third control signal for controlling the buffer overflow signal;
   a first control signal generating unit for outputting a fourth control signal responsive to the counting unit and the buffer overflow signal of the microprocessor;
   a first AND gate connected to respond to the first control signal generating unit, the beat clock signal and an output of the counting unit;
   a stop point detecting unit for shifting the serial data of the digital signal processing unit with a clock pulse signal of the first AND gate, for latching the data when the buffer RAM is in the overflow state in response to a given level of the output of the first control signal generating unit, and for detecting the data of a stop point by comparing the latched data with data being presently inputted, when an overflow of the buffer RAM is released;

a second control signal generating unit for producing a fifth control signal by receiving an output of the stop point detecting unit, the buffer overflow signal, the retry signal of the microprocessor and a reset signal; and a switching unit for interfacing the serial data and the beat clock signal to the optical disk ROM decoding unit in response to the output signal of the second control signal generating unit.

3. The system as claimed in claim 2, wherein the clock generating unit receives the left/right clock signal of the digital signal processing unit both directly and through an integrator and logically combines them with a first exclusive OR gate to produce the clock signal.

4. The system as claimed in claim 2, wherein the counting unit is constructed so that the beat clock signal is counted by a counter in response to clock pulse signals of the clock generating unit being inputted to a clear terminal of the counter through a first inverter gate, inverted and non-inverted outputs of the counter being ORed by first and second OR gates, the output of the first OR gate being applied to the clear terminal of a first flip-flop, the clock signal of the clock generating unit being applied to the clock terminal of the first flip-flop to control the serial data through an output terminal of the first flip-flop, and the output of the second OR gate being supplied to control the buffer overflow signal.

5. The system as claimed in claim 2, wherein an output of the counting unit and the buffer overflow signal of the microprocessor are ANDed by a second AND gate and, the buffer overflow signal is applied to the clear terminal of a second flip-flop to output an enable signal through the output terminal of the second flip-flop.

6. The system as claimed in claim 2, wherein the stop point detecting unit is constructed so that the serial data of the optical disk digital signal processing unit is synchronized with the clock pulse signal of the first AND gate and is shifted into shift registers and latched into latches responsive to the first control signal generating unit when an overflow occurs, and when the overflow is released the serial data inputted to the shift registers are compared to data which have been latched at the latches, said comparison being effected by an exclusive OR gate of the stop point detecting unit to detect the data of the stop point.

7. The system as claimed in claim 2, wherein the second control signal generating unit is constructed so that the output signal of the stop point detecting unit and the retry signal of the microprocessor are ORed by a third OR gate, the output of the third OR gate is logically combined with the reset signal by a third AND gate and then applied to the clear terminal of a third flip-flop, and the buffer overflow signal is applied to the clock terminal of the third flip-flop to output an enable signal through the output terminal.

8. The system as claimed in claim 2, wherein the switching unit comprises first and second buffers for interfacing the beat clock signal and serial data of the optical disk digital signal processing unit to the optical disk ROM decoding unit responsive to the second control signal generating unit.

* * * * *